May 9, 1967  F. L. CALIFANO ETAL  3,318,749
METHOD AND APPARATUS FOR LAMINATING THIN SHEET
MATERIAL TO RELATIVELY RIGID BASE UNITS
Filed Sept. 5, 1963  3 Sheets-Sheet 1

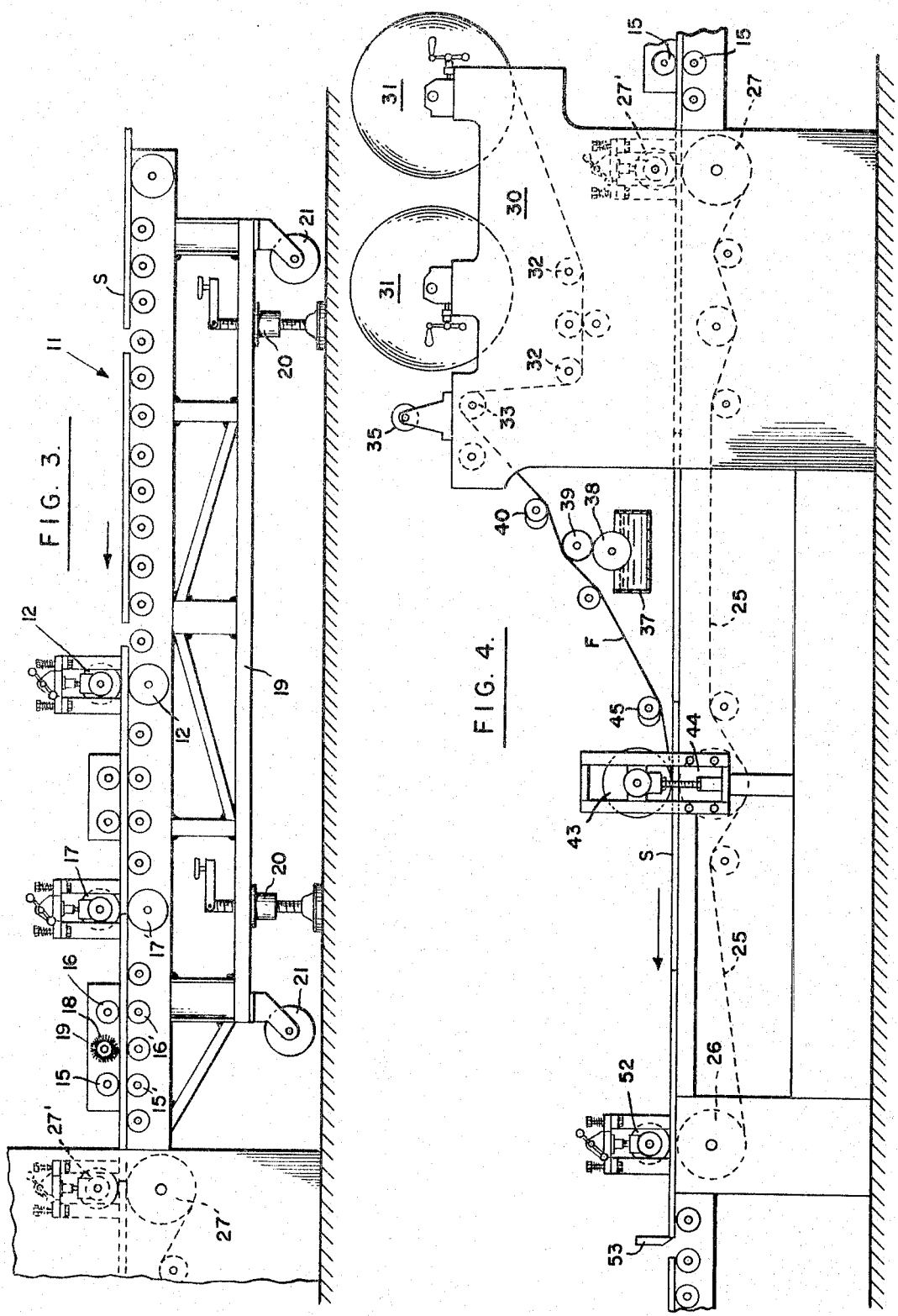

May 9, 1967 F. L. CALIFANO ETAL 3,318,749
METHOD AND APPARATUS FOR LAMINATING THIN SHEET
MATERIAL TO RELATIVELY RIGID BASE UNITS
Filed Sept. 5, 1963 3 Sheets-Sheet 3

United States Patent Office 3,318,749
Patented May 9, 1967

3,318,749
METHOD AND APPARATUS FOR LAMINATING THIN SHEET MATERIAL TO RELATIVELY RIGID BASE UNITS
Frank L. Califano, Hackensack, and Paul N. Shutak, Kearny, N.J., assignors to The Flintkote Company, New York, N.Y., a corporation of Massachusetts
Filed Sept. 5, 1963, Ser. No. 306,827
5 Claims. (Cl. 156—229)

This invention relates to method and apparatus for laminating thin sheet material to relatively rigid stock such as gypsum board.

Laminated products wherein relatively thin or foil-like sheet material, such as aluminum foil, wood veneer, vinyl sheeting, and decorative paper, is united to a base of relatively thick or rigid material have come into rather extensive use.

The production of such laminated products heretofore has been carried on by apparatus which is relatively inefficient in operation and lacks the versatility for use in producing a variety of such laminated products.

Foil-like materials, such as those above-mentioned are of a thickness generally measuring not more than several thousandths of an inch. They exhibit an inherent and frequently pronounced tendency to wrinkle or crease in the convolutions of the rolls in which they are customarily supplied and to remain so during the feeding thereof from the supply roll to a point of use. Thus, when a continuously moving sheet of such foil-like material is brought into contact with a base of relatively rigid or thick stock for lamination thereto, the wrinkles or creases of the foil-like material are exhibited in the laminated face of the finished product. In actual practice, the number and extent of such wrinkles or creases obviously may be such that the laminated product does not meet specifications and is considered as "reject" material.

As above indicated moreover, apparatus heretofore utilized for producing laminated products of the presently mentioned type lacks the versatility and flexibility required to produce such laminated products from a variety of base stock materials to which there may be selectively laminated any of a variety of suitable film or foil-like materials, such as those above mentioned, in a continuous manner at relatively high machine speeds.

The principal object of the invention, accordingly, is to provide a method and apparatus for the production of laminated products which affords a versatility and flexibality in terms of adaptability to laminating, in a continuous operation, any of the above mentioned film or foil-like sheet materials to a base of relatively thick or rigid stock such as gypsum board, gypsum lath, so-called "soft" insulation board, hard board, asbestos cement, metal sheets, plastic sheet, and the like.

An important object of the invention is to provide method and apparatus of the character aforesaid which will make possible the continuous production of such laminated products from any of the diverse base and laminant materials mentioned and without attendant occurrence of wrinkles in the laminant layer of the finished product.

Briefly stated, the foregoing objects of the invention are achieved by apparatus in which pre-cut units or slabs of the base material are conveyed successively along a common horizontal path, with the leading edge of each unit disposed substantially in abutment with the trailing edge of the preceding unit, and the sheet of film or foil-like material being continuously fed from a supply roll toward the path of movement of the units or slabs. Suitable adhesive is applied to one face of the continuously fed sheet or film or foil. This face is then brought into laminating contact with the opposed surface of the abutted base units as they travel along in the aforesaid horizontal path.

In accordance with an important feature of the invention, the sheet of film or foil laminant is subjected substantially immediately before the laminating adhesive is applied thereto, and also substantially immediately before the adhesive-coated face of the laminant is brought into laminating contact with the base units or slabs, to a spreading action for removing any wrinkles or creases present in the film or foil-like laminant at either or both those stages. In other words, any such wrinkles in the foil are removed before they have opportunity to become fixed in the laminated product.

After the sheet of laminant has been brought into laminating contact with the succession of abutted base units moving in the aforementioned path, suitable bonding pressure is exerted on the thus-combined materials, following which the sheet of laminant is transversely severed, as by slitting the same, along the line of juncture between the abutting units. The thus individualized laminated units are then separated from one another for discharge from the conveyor.

Other objects, advantages and details of the invention will be readily apparent from the following more detailed description thereof when read in conjunction with the accompanying drawings, in which:

FIGS. 3, 4 and 5 are enlarged views showing in elevation, respectively, the feed end section, the laminating section, and the take-off section of the apparatus;

As one illustrative use of this method and apparatus, reference will be made to the laminating of aluminum foil to gypsum board and gypsum lath. As above indicated, however, the invention is readily adaptable for use in laminating paper and plastic film materials to base units of soft board, hard board, asbestos cement, and other relatively rigid stock.

Figure 1:
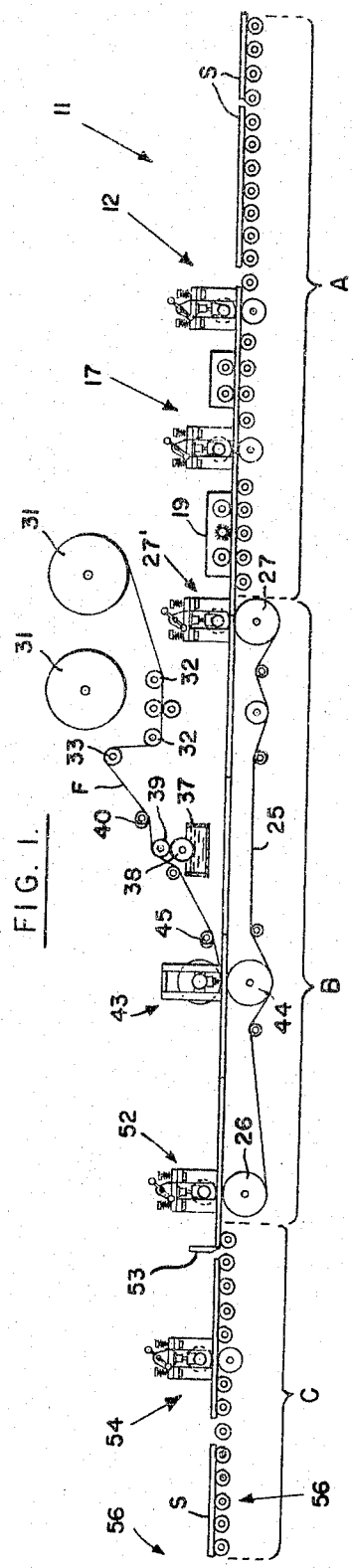
FIG. 1 is a diagrammatic view, in longitudinal section, of apparatus embodying the present invention.

Referring more specifically to the drawings, to FIG. 1 in particular, it will be noted that the apparatus comprises three sections: a feed end section A, a laminating section B, and a take-off section C.

Feed section A comprises a driven roller conveyor, indicated generally by reference numeral 11, for receiving pre-cut slabs or units of gypsum board or lath, indicated at S, and feeding the same forwardly along a horizontal path of travel.

Moveable guide plates (not shown) may be mounted at the sides of the conveyor 11 to position the boards transversely in alignment thereon.

Mounted at a suitable distance from the rear end of conveyor 11 is an assembly 12 of vertically spaced rolls which are driven at a speed effective to cause the leading edge of each successive board on the conveyor to advance forwardly into abutting engagement with the trailing edge of the preceding board on the conveyor. Thus, the boards S are butted together lengthwise so as to constitute, in effect, a continuous length or strip moving through the successive operating steps. The upper roll of the assembly 12 has a supporting bearing arrangement which is typical of the mounting of other rolls employed in this apparatus and mentioned hereafter. The upper roll is indicated at 12b and has its shaft ends journalled in bearing blocks 12a which are vertically adjustable in the machine framework by means of manually operable crank 12c.

Mounted at suitably spaced intervals along the length of conveyor 11 are upper hold-down rolls 15, 16 and 17, and companion lower rolls 15', 16' and 17', respectively, which serve to prevent overriding of one board by another as the boards are conveyed through the apparatus.

Ajacent the discharge end of conveyor 11, and preferably intermediate the rolls 15, 15' and 16, 16' there is mounted a driven rotary brush 18 for smoothing down the upper surface of units S and for removing dirt and dust therefrom. Rotary brush 18 desirably is mounted within a hood 19 having a suction fan (not shown) leading to a collector (not shown).

Feed section A is preferably separable from laminating section B. To that end, conveyor 11 and its associated parts are supported on a framework 19 (FIG. 3) carrying screw type jacks 20 whereby the entire feed section may be raised or lowered to bring the supporting surface of conveyor 11 into a common horizontal plane with that of the supporting surface of a conveyor which carries units S through laminating section B. The arrangement is such that, in its operative position the feed section A is supported from the floor by means of the jacks 20, with the casters 21 at the lower ends of the framework then being disposed above the floor surface. When these jacks are lowered to permit the casters 21 to support the feed section, it may be rolled away from its illustrated operating position, adjacent laminating section B.

Figure 2:
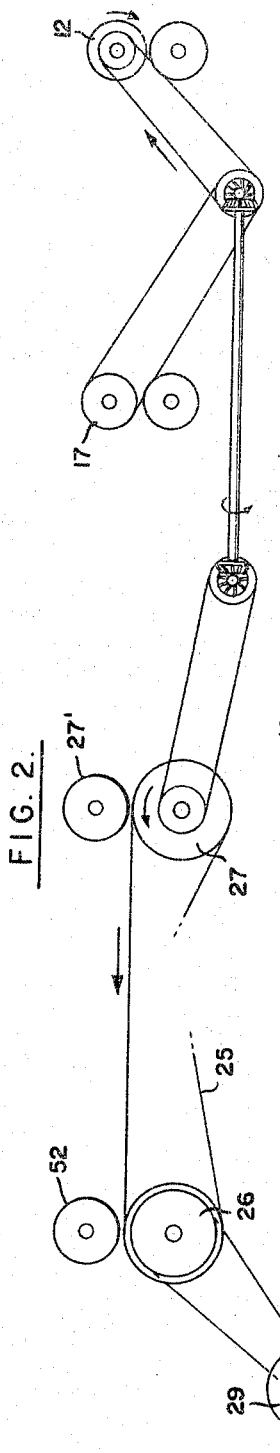
FIG. 2 is a diagrammatic illustration of the driving means for the laminating portion of the apparatus shown in FIG. 1.
Figure 7:
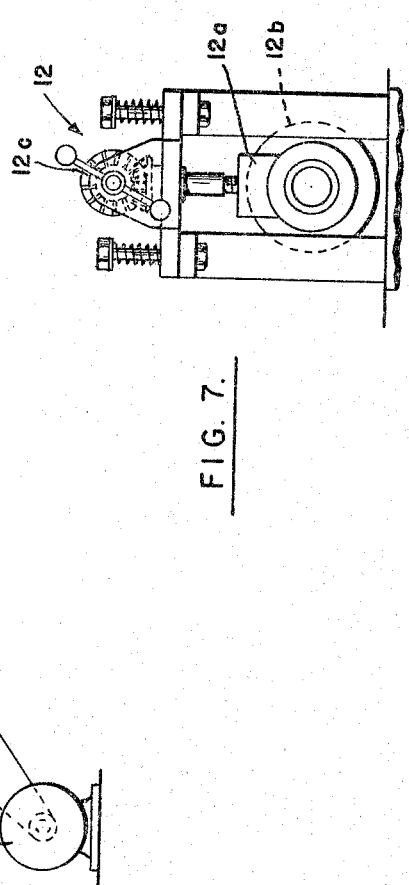
FIG. 7 is an enlarged view in elevation, of a roller mounting arrangement used in this apparatus.

The laminating section B has an endless belt conveyor comprising a belt 25 passing around rollers 26 and 27 disposed at opposite ends of this section. Roller 26 is driven in any convenient manner, as by a sprocket and chain, from a variable speed motor 29 as shown in FIG. 2. The horsepower of the motor 29 and its driving coupling with pulley 26 are such as to feed units S through the machine at speeds ranging from 25 to 95 feet per minute. A pressure roller 27' cooperates with belt 25 and pulley roller 27 as illustrated.

At the feed end of conveyor belt 25, the supporting machine farmework 30 extends upwardly above and at the sides thereof. Framework 30 supports supply rolls 31 of aluminum foil or like material to be laminated with the board units S as they are moved forwardly by the conveyor belt 25. These supply rolls are mounted so as to permit feeding of the foil material, indicated by reference letter F, from either roll, thence around guide and tensioning rolls indicated at 32 and 33, and downwardly toward the surface of the board units S carried by conveyor belt 25.

Also supported by framework 30 is a roll 35 which may be heated and over which a sheet of thermoplastic laminant may be passed to soften it prior to introducing it to the units S.

Mounted above conveyor belt 25 and forwardly of guide rolls 33 are means for applying a layer of adhesive to the lower face of the advancing foil sheet. The adhesive applying means is of more or less conventional form, being comprised of a container 37 for the adhesive, a pick-up roll 38, and an applicator roll 39 by which adhesive is applied to the foil sheet.

Figure 6:
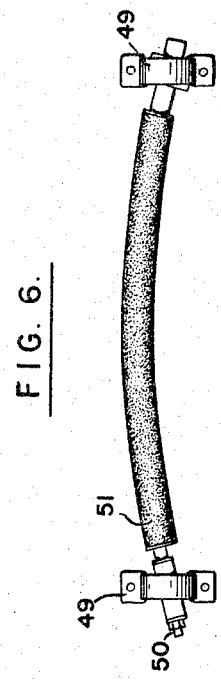
FIG. 6 is a plan view of an expander roll as used in apparatus according to this invention.

It is an important feature of the invention that immediately before adhesive is applied to the foil, and also immediately before the adhesive-coated laminant is brought into contact with the surface of the board units S, the foil is subjected to a spreading action. In the performance of this spreading action according to the present specifically disclosed embodiment, there is mounted in the path of the foil, immediately ahead of the adhesive applying roll 39, an expander roll 40 for contact with the upper face of the foil. This expander roll preferably is of the type known commercially as the "Mount Hope" expander bow. As best seen in FIG. 6, this type of device comprises a bowed steel axle 50 having its ends fixedly secured in mounts 49 and a rubber sleeve 51 which rotates about axle 50 on ball bearings (not shown). The bowed shaped of the sleeve 51 creates an infinite number of spreading actions across the width of the foil web, serving thereby to eliminate wrinkles, slack, distortion, etc. By varying the degree of bow in the axle 50 and sleeve 51, the expander roll can be adjusted to provide precisely the correct spreading characteristics for any given type of web material. Although a "fixed bow" type can be employed, i.e., having a fixed degree of bend in the expander roll, preferably an expander roll of the "Vari-Bow" type is employed. The "Vari-Bow" incorporates means (not shown) for varying the arc or bend in the axle in infinitesimal steps, while the machine is running, if desired, to effect fine adjustments in spreading action. Adjustments in spreading action also are effected by varying the "wrap," or the degrees of arc contact between the webs and expander roller measured in a plane normal to the roll axis.

At a suitable distance forwardly of the adhesive applying means, there are laminating rolls comprising a vertically adjustable upper press roll 43 spaced above conveyor belt 25, and a lower bed roll 44 mounted between the upper and lower runs of conveyor belt 25.

As will be seen from FIGS. 1 and 4, the foil F carrying a layer of adhesive on its lower face, and moving downwardly at an angle toward conveyor belt 25, is brought into contact with the upper surface of board units S at the nip between rolls 43 and 44, whereby pressure is applied to increase adhesion between the foil and board material.

Immediately prior to entrance of foil between the laminating rolls 43 and 44, there is mounted a second expander roll 45 for contact with the upper face of the foil. This second expander roll is of the same construction as that of the expander roll 40 which has been previously described with reference to FIG. 6, and functions in a similar manner to remove wrinkles, slack, distortion, etc. that may be present in the foil at this point. The amount of bow and wrap of the sleeve of expander roll 45 may be adjusted differently from that of expander roll 40, thereby to effect different spreading actions adapted to the conditions of the foil F at these different spaced points.

As previously mentioned, the spreading action exerted by expander rolls prior to the application of adhesive and then, prior to uniting the laminant and board is a significant aspect of this invention. By spreading the web in advance of the adhesive applicator means it is ensured that adhesive actually will be applied across the entire web area, including even the most minute crevices formed by wrinkles therein. Then, the effect of the second spreading action is to bring the foil flatly into contact with the board units and thereby prevent the formation of ridges, bubbles and other distortions in the finished product.

The units S having the sheet of foil F applied thereto then pass under press rolls 52 which exert pressure thereon utilizing roll 26 as a back-up roller. This action ensures proper adhesion of the foil F to board units S.

Figure 5:
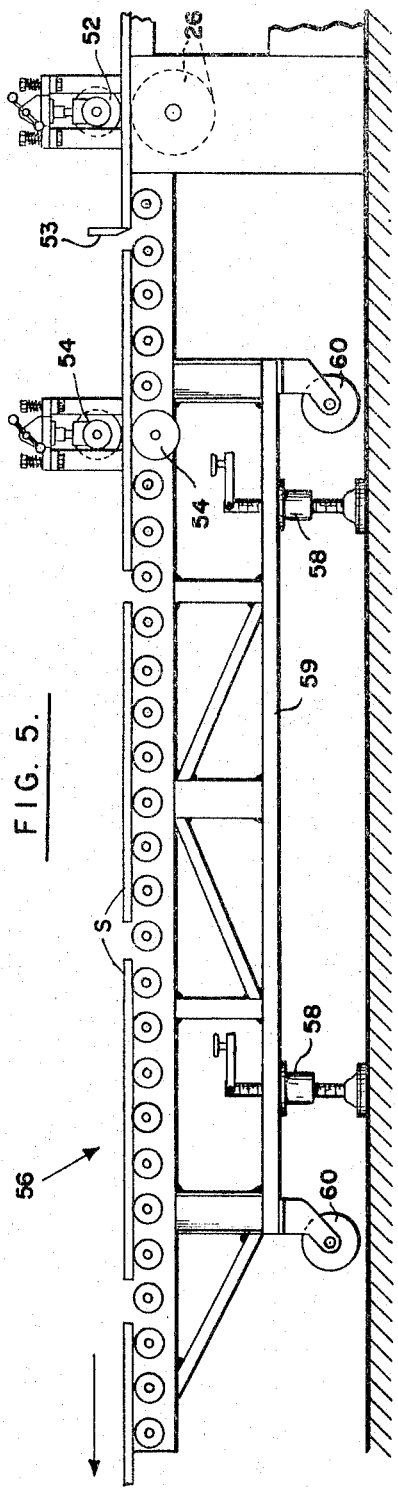

The take-off section C, shown in FIG. 5, is somewhat similar in construction to that of feed end section A in that the former section embodies a conveyor 56 having a framework 59. The framework 59 is provided with screw-type jacks, whereby conveyor 56 is brought into a common level with the delivery of board units S from laminator section B, and casters 60 for use when section C is moved into and out of operative position. As board units emerge from press rolls 52, they are separated from one another by production line workers stationed at opposite sides of the machine. This separating operation involves a slitting of the foil bridging the abutting ends of adjoining board units by a manually manipulated knife as indicated at 53. Thereafter, the leading laminated board units S are accelerated and thereby separated from the trailing units by means of a pair of rolls 54 which are driven at a speed in excess of that of press rolls 52 and conveyor 25.

It will be understood that various departures from the specifically disclosed embodiment of the invention can be effected without departing from the scope thereof as defined by the following claims.

What is claimed is:

1. A method of laminating continuously fed foil-like sheet material to substantially rigid base units, comprising the steps of:
    (a) exerting a spreading action on one surface of said foil-like sheet material laterally toward the side edges thereof, to remove wrinkles and other distortions present in said surface;
    (b) applying fluid adhesive to the opposite surface of said foil-like sheet material substantially immediately subsequent to the completion of said spreading action;
    (c) exerting a second spreading action on said first-named surface of said foil-like sheet material laterally toward the side edges thereof, to remove wrinkles and other distortions present in said foil-like sheet material after said application of adhesive to said opposite surface thereof;
    (d) bringing said adhesive-coated opposite surface of said foil-like sheet material into surface contact with a confronting surface of said base units substantially immediately subsequent to said second-spreading action; and
    (e) applying surface pressure to the thus united foil-like sheet material and said base units to bond them into the form of a composite laminated structure.

2. A method as defined in claim 1, wherein said first-named spreading action is exerted on said surface of said foil-like sheet material as it is being continuously fed toward a plurality of said base units while the latter are being moved in succession in a common horizontal path, and wherein said adhesive-coated surface of said foil-like sheet material is brought into contact with the confronting surfaces of said units as the latter continue their movement in said path.

3. A method as defined in claim 2, wherein the composite laminated structure is slitted, transversely of the direction of movement thereof in said path, along the lines of juncture between successive ones of said base units.

4. A method as defined in claim 2, wherein said foil-like sheet material is fed toward said path from a supply thereof disposed above said path.

5. Apparatus for continuously laminating foil-like sheet material to rigid base material, comprising:
    (a) means for conveying pre-cut units of said rigid material in succession along a common path to travel;
    (b) means associated with said conveying means for causing the units conveyed thereby to be disposed with the leading edge of each unit abutting the trailing edge of the preceding unit in the succession of conveyed units;
    (c) means for continuously feeding a web of said foil-like sheet material from a source thereof toward said path;
    (d) means for applying adhesive to one surface of said foil-like sheet material during the feeding thereof toward said path;
    (e) means engaging the opposite surface of said foil-like sheet material in advance of said adhesive-applying means to remove wrinkles and other distortions therefrom;
    (f) means for uniting said foil-like sheet material with said base units after said application of adhesive to the first-named surface thereof;
    (g) means engaging said opposite surface of said foil-like sheet material in advance of said uniting means to remove wrinkles and other distortions from said opposite surface of said foil-like sheet material after said application of adhesive to said first-named surface thereof immediately ahead of said uniting means;
    each of said means (e) and (g) comprising a spreader roller extending transversely of the path of movement of said foil-like sheet material, each of said spreader rollers having its axle bowed in the direction of travel of said foil-like sheet material; and
    (h) means disposed in said path and beyond said uniting means, for exerting pressure on the laminated structure composed of said foil-like sheet material and rigid base units.

References Cited by the Examiner

UNITED STATES PATENTS

| | | | |
|---|---|---|---|
| 868,098 | 10/1907 | Kiernan | 26—63 |
| 1,595,544 | 8/1926 | Farrell | 26—63 |
| 1,599,257 | 9/1926 | Voegeli | 26—63 |
| 2,259,362 | 10/1941 | Young | 156—164 |
| 2,425,660 | 8/1947 | Ware et al. | 156—229 X |
| 3,008,861 | 11/1961 | Rees et al. | 156—229 |

EARL M. BERGERT, *Primary Examiner.*

P. R. WLYIE, W. E. HOAG, *Assistant Examiners.*